June 2, 1970  J. E. COORDES  3,515,502
MULTIPURPOSE CONTROL VALVE
Filed July 26, 1967  3 Sheets-Sheet 1

JOHN E. COORDES
INVENTOR.
BY H. M. Saragovitz
E. J. Kelly, H. Berl
and R. M. Lyon
ATTORNEYS

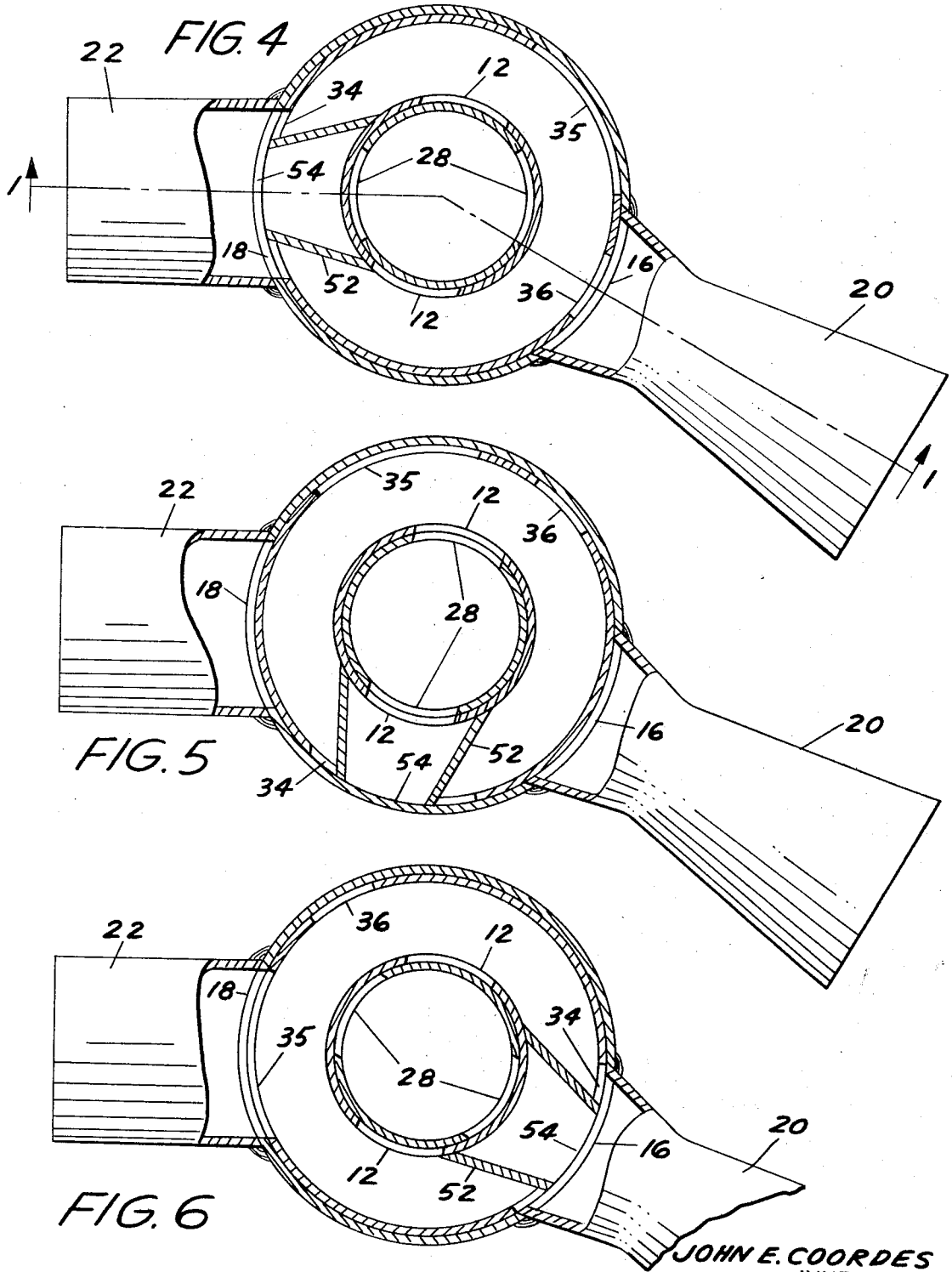

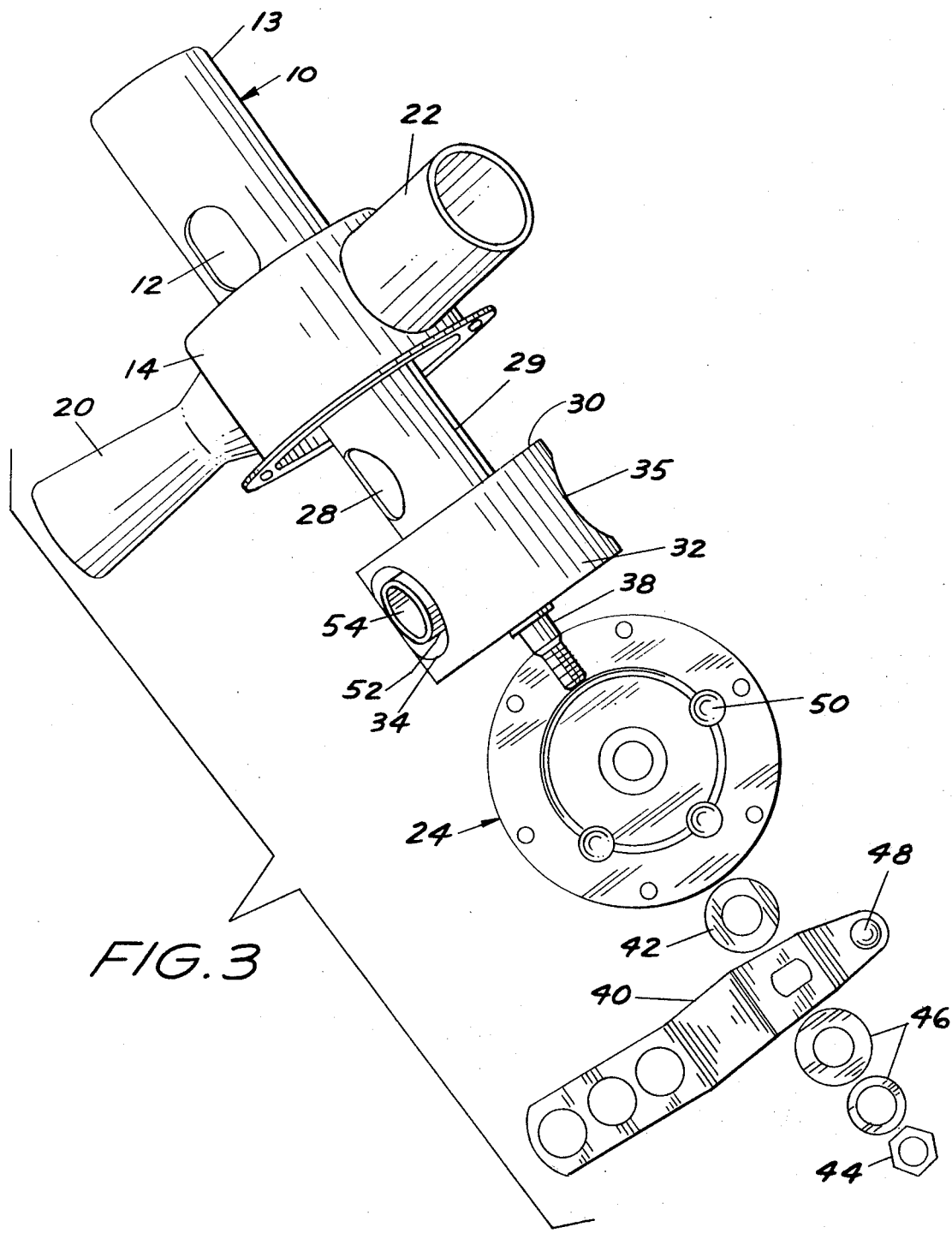

United States Patent Office 3,515,502
Patented June 2, 1970

3,515,502
MULTIPURPOSE CONTROL VALVE
John E. Coordes, Oakland, Mich., assignor to the United States of America as represented by the Secretary of the Army
Filed July 26, 1967, Ser. No. 656,637
Int. Cl. F04f 5/20, 5/48
U.S. Cl. 417—178            10 Claims

ABSTRACT OF THE DISCLOSURE

A multipurpose control valve comprising an outer casing having an inlet tube, a cylindrical valve chamber, an aspirator and an exhaust tube, an inner casing rotatably journaled in said outer casing and comprising an elbow-shaped tubular member and a control handle for varying the direction of flow and function of the valve, said valve incorporating the functions of a directional valve, an aspirator and a relief valve in a single composite structure.

---

The invention described herein may be manufactured, used, and licensed by or for the Government for governmental purposes without payment to me of any royalty thereon.

In recent years, several flotation devices for military vehicles have been developed utilizing the exhaust gases of the vehicle to inflate gas bags or other support systems designed to achieve flotation of the vehicles. Such utilization of the exhaust gases has necessitated the development of a number of gas valves designed to permit redirection of the exhaust gases into proper channels, tubes and flotation members. Such valves, for the most part, provide for very slow inflation due to utilization solely of the vacuum gases. Furthermore, prior art systems required the use of auxiliary pop-off or relief valves to provide gas pressure outlets when inflation or pressurization is complete. Such auxiliary valves are expensive and add much unnecessary weight to the system.

According to the present invention, there is provided a three-way valve incorporating the function of a three-way directional valve, an aspirator, and a relief valve in a single integral structure. More particularly, the invention provides a multipurpose control valve as described herein comprising a stationary outer case and a three position rotatable inner casing actuated by means of a detent limited operating handle secured to the inner case through the outer case. Still more particularly, the invention provides a valve as described above having an outer casing comprising an inlet tube, a cylindrical valve chamber at one terminus of said inlet tube, said cylindrical valve chamber having at least two ports therein, one of which ports open to an aspirator and the other, or others, to exhaust tubes, an inner casing comprising a rotary valve member of hollow elbow shape mounted within the cylindrical valve chamber so as to turn about the vertical axis thereof, and an outlet port in said rotary valve member. This rotary valve member is rotated within the outer casing by means of a handle outside of the outer casing which is designed to turn a shaft journaled in the outer casing and fixedly attached to the rotary valve member along its axis.

It is therefore an object of the present invention to provide an improved multipurpose control valve for use in the selective distribution of gases, exhaust or otherwise, under pressure.

Another object of the present invention is the provision of a multipurpose control valve which provides more rapid inflation of flotation devices utilizing exhaust gases in the buoying means.

Yet another object of the present invention is the provision of a multipurpose control valve which eliminates the need for a separate relief or pop-off valve when back pressure in a flotation device equalizes the pressure exerted by the exhaust gases.

Still another object of the present invention is the provision of a valve which incorporates the functions of a multipurpose directional valve, an aspirator and a relief valve in a single integral unit.

Other objects and advantages of the present invention will be made obvious to those skilled in the art by the following description when considered in relation to the accompanying drawing of which:

FIG. 3 shows an exploded view of the assembled parts of the multipurpose valve according to the invention;

FIG. 4 shows a valve-study diagram of the three-way valve of the present invention in its inflating position;

FIG. 5 shows a valve-study diagram of the multipurpose valve of the present invention in its bypassing position; and FIG. 6 shows a valve study diagram of the valve of the present invention in its exhaust or deflating position.

Figure 1:
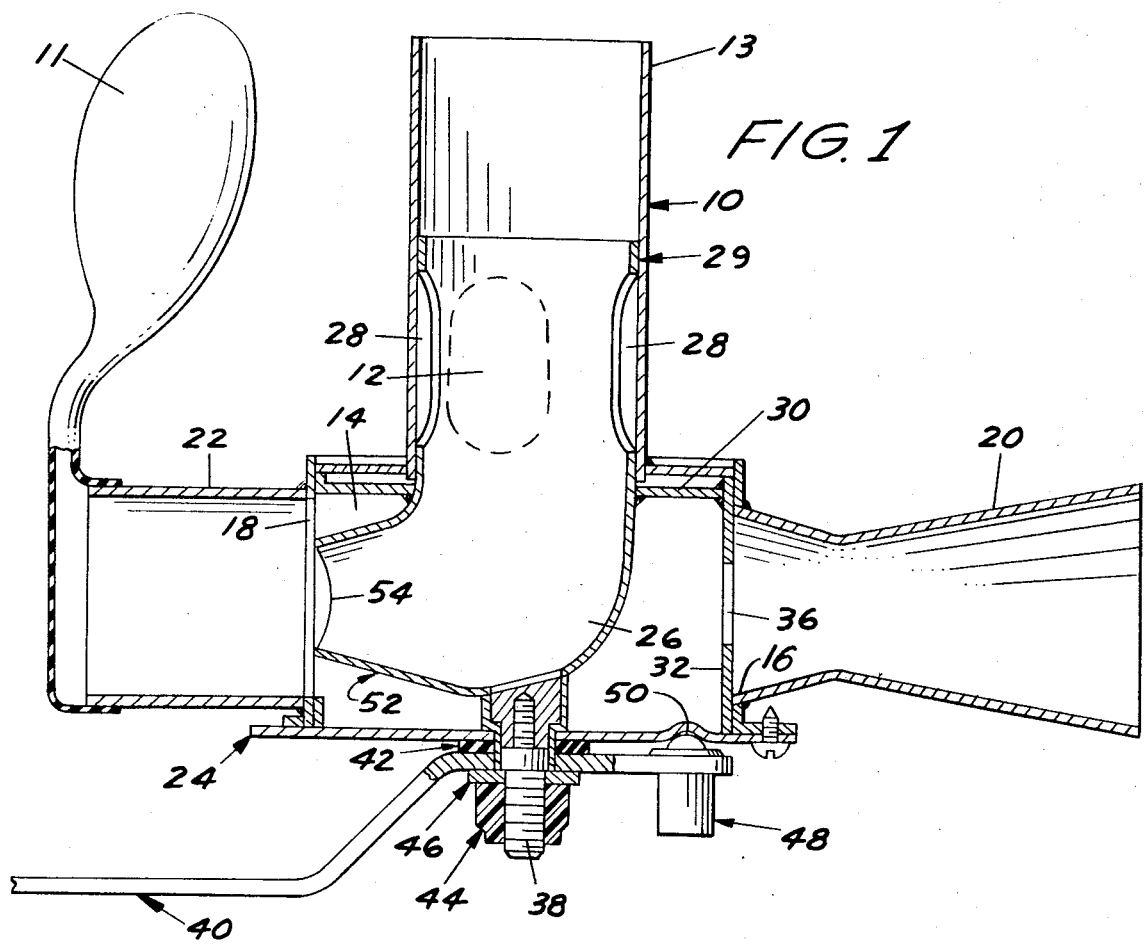
FIG. 1 is a cross-sectional view of the valve of the present invention along the line 1—1 of FIG. 4.

Referring now to the drawing wherein similar numerals will refer to similar parts, FIG. 1 shows a cross-sectional view of the present invention along the line 1—1 of FIG. 3. A flotation bag which can be mounted on a vehicle is shown generally at 11. This bag must be filled with gas and maintained in this conditon for the time period necessary to keep the vehicle afloat. To accomplish this purpose, the bag 11 is shown connected to exhaust tube 22 of the valve which is the subject matter of the invention.

The valve according to the invention utilizes vehicle exhaust gas to inflate bag 11. An inlet tube 10 is connected to the engine exhaust system at 13. Tube 10 directs the exhaust from the vehicle engine to the valve system. In FIG. 1, inlet tube 10 is shown as having ports 12 arranged at angular spacings of 180° therein. There need be only one such inlet tube port. The orientation of the inlet tube port or ports as the case may be is determined by the requirement that they be aligned with the linear portion ports 28 of the inner rotatable casing only when all other parts of the valve are closed. At the terminus of inlet tube 10 there is a cylindrical valve chamber 14. In the embodiment shown, the cylindrical valve chamber has a pair of ports 16 and 18 angularly spaced at 150°. These ports need not have this exact angular spacing but must be angularly displaced from inlet tube port or ports 12. The first cylindrical valve chamber port 16 opens into aspirator 20. Port 18 opens into a second tube described as the exhaust or inflation tube 22. Exhaust tube 22 is connected to the device to be inflated. The outer casing further comprises a cover plate 24 which closes one of the planar surfaces of the cylindrical valve chamber. The aspirator is old and well known generally as an apparatus for producing suction or, removing collecting matter by suction.

Figure 2:
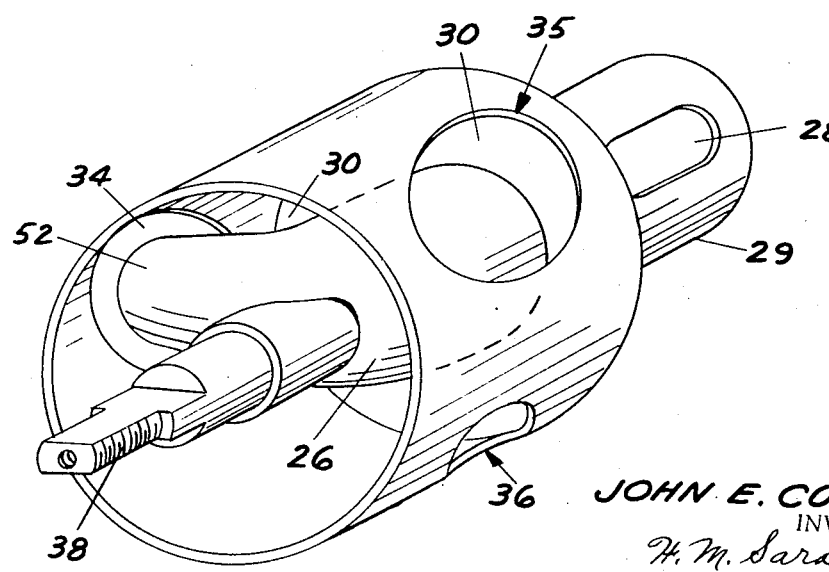
FIG. 2 is a perspective view of the inner casing weldment or precision casting of the valve of the present invention.

The inner casing which may consist of a weldment or preferably a precision casting is shown in the cross-section of FIG. 1 and also in perspective in FIG. 2. An exploded view of the assembled parts is shown in FIG. 3. The inner casing consists of an elbow shaped tubular member of 26 having an elongated linear tube portion 29, a cylindrical valve liner 32, a locator 30, and a center plug 38. Tubular member 26 is formed with a right angle bend as can be seen in the drawing. Because of the similarity between the shape of this tube and a pitot-tube, it has also become commonly referred to as a pitot-shaped tubular member. At one end of the elbow is a funnel shaped portion 52 having a port 54 therein. At the other end of the elbow shaped portion is elongated linear portion 29. Ports 28 are arranged at angular spacings of approximately 180° about linear portion 29. There need be only one port 28 in the linear portion however, and the spacing need not be 180° when two or more ports are utilized. As long as inlet tube ports 12 are aligned with one or more ports 28 when all other parts are closed, the valve will function properly. The elbow shaped tubular member 26 is mounted in the locator 30 which is welded or otherwise secured to a valve liner 32. Valve liner 32 is provided with ports 34, 35 and 36. Ports 34 and 35 are arranged at angular spacings of 150° and port 36 is arranged at an angular spacing of 70° with respect to port 35.

Welded or otherwise secured to the base of rotary valve member 26 along the vertical axis thereof is a center plug 38 which passes through cover plate 24 and has control handle 40 mounted thereon. According to the preferred embodiment shown, a washer 42 is mounted between the control handle and the cover plate, and the handle is secured in place by an elastic stop nut 44 which holds washer 46 against the control handle. The valve handle 40 has a detent 48 mounted thereon which may be turned to engage recesses 50 in the cover plate 24 in any of its plurality of positions. The engagement of detent 48 and recesses 50 provides a lock for control handle 40 in a plurality of positions. Any other suitable means for rotating the inner casing within the outer casing may be utilized so long as the system remains pneumatically sealed.

The port 54 which is located in the funnel shaped portion 52 of elbow shaped tubular member 26 is designed so as to have an opening slightly smaller than cylindrical chamber port 18 and of a slightly larger size than valve liner port 36. The exact dimensions of these various ports as well as the shape of the elbow should be aerodynamically perfect as possible so as to achieve maximum efficiency when the valve is utilized to direct the flow of gases. Through adjustment of such dimensions, maximum efficiency can be achieved.

The operation of the device will now be described with reference to FIGS. 4–6 which present valve study diagrams demonstrating the actual operational features of the valve. As shown in FIG. 4, in order to utilize the exhaust gases entering elbow shaped tubular member via the inlet tube to inflate, the valve is oriented with port 54 aligned with port 18 and port 36 aligned with port 16. By design, all other ports are closed except ports 16 and 36. The exhaust gas now passes down tube 10, into member 26, out port 54, and then through port 18 into exhaust tube 22. Simultaneously, as a result of a pressure differential caused by the flow of exhaust gas through port 18, atmospheric air is pulled in through port 16 and passes through port 36, around elbow shaped member 26, within valve liner 32, and thence through port 18 into exhaust tube 22. When pressure in exhaust tube 22 which is connected to port 18 is equal to the exhaust pressure, the exhaust gas flowing from port 54 into port 18 will maintain steady pressure in exhaust tube 22. Any exhaust gas which in excess of that necessary to maintain this steady pressure will now reverse the aspirator function of the valve to provide a relief valve, i.e. excess exhaust will flow out port 18 around elbow shaped member 26 within valve liner 32 and thence through port 36 and out of the system through port 16 and aspirator 20. Thus ports 18 and 36 have a twofold purpose. Initially they expedite building of pressure in exhaust tube 22 acting as an aspirator and subsequently, when sufficient pressure has been established in exhaust tube 22, they act as a relief valve for the system. When port 36 functions as a relief valve, this may cause a noticeable change in engine performance as the area of port 36 is less than the area of port 52 such that an added restriction on the exhaust system is introduced. Such a change in an engine performance is sufficient to notify the operator to change the valve position to the by-pass position. In the by-pass position, pressure will be maintained in the flotation device while the exhaust by-passes the valve, as more fully explained hereinafter.

In position number two or the by-pass position as shown in FIG. 5, the two linear portion ports 28 are aligned with the two inlet tube ports 12 thus imposing no restriction on the valve system and providing direct access to the atmosphere for the exhaust gases through the aforementioned ports. When in this by-pass position, all ports other than those at 12 and 28 are closed.

As shown in FIG. 6, when the valve is set in position three or the deflating position, port 54 is aligned with port 16 which forms the mouth of aspirator 20. With the valve in the deflating position, the exhaust gas will pass through inlet tube 10, into elbow member 26, out of port 54, and finally into aspirator 20. The operational principle of an aspirator is well known. It is sufficient here to state that the exhaust gas passing through port 54 and aspirator 20 will create a partial vacuum and hence the pressure at this point will be lower than the pressure in port 18 and tube 22. Thus, entrapped gas in the flotation system is drawn out of port 18 by exhaust passing through port 54 and hence out of port 16 and into aspirator 20. As the drawing shows, all other ports are closed in this position. Thus, the invention provides a multipurpose valve which serves the triple function of a directional valve, relief valve and an aspirator in applications where the three functions are necessary.

Although the invention has been disclosed in conjunction with the exhaust system of a vehicle and a flotation system for the vehicle, it should be understood that the valve has a number of applications and should not be limited to use in this area or be considered as disclosed only in conjunction with or as an integral part of such a flotation system. The valve is suitable for use in any number of systems wherein mixing of gases or fluids or regulation of the flow of fluids under pressure into and out of a system wherein the relief valve and aspirator functions may be utilized to advantage.

Furthermore, although the valve is disclosed using metal casings, castings and weldments, the use of suitable plastic materials particularly for purposes of precision casting the hollow elbow-shaped rotary valve member may be advantageous in numerous applications.

I wish it to be understood that I do not desire to be limited to the exact details of construction shown and described, for obvious modifications will occur to a person skilled in the art.

I claim:
1. A multipurpose control valve comprising
    an outer casing and an inner casing;
    said outer casing including a valve chamber having ports therein communicating with an inlet tube, an aspirator, and an exhaust tube connected to said outer casing to permit ingress and egress of gases;
    said inlet tube having ports positioned in the side thereof;
    said inner casing being rotatably fitted in said outer casing and including
        an elbow shaped tubular member and a cylindrical valve liner, said cylindrical valve liner having ports positioned in the side thereof;
        said elbow shaped tubular member having a funnel shaped portion with a port at its terminus and an elongated linear portion having ports positioned in the side thereof;
        said elbow shaped tubular member being mounted within said cylindrical valve liner such that said terminus port is aligned with one of said ports on said cylindrical valve liner;
    said ports of said inner casing and said outer casing being so oriented that said multipurpose valve can function as a directional valve, an aspirator, or a relief valve depending upon the alignment of said ports.

2. A multipurpose control valve according to claim 1 wherein means for turning said rotatable inner casing is provided comprising,
 a center plug secured to one end of said rotatable inner casing,
 a control handle having a detent mounted thereto, and
 a cover plate having a plurality of recesses therein and being mounted on said valve chamber,
  said detent engaging said recesses so as to provide a plurality of fixed settings for said valve by turning said handle.

3. A multipurpose control valve according to claim 1 wherein said elongated linear portion has at least one port therein which can be aligned with said side port in said inlet tube when said inner casing is rotated.

4. A multipurpose control valve according to claim 1 wherein,
 said ports in said cylindrical valve liner comprises at least first, second and third cylindrical valve linear ports positioned therein,
 said first cylindrical valve liner port being larger than said funnel-shaped portion port.

5. A multipurpose control valve according to claim 4 wherein said second cylindrical valve liner port is larger than said funnel-shaped portion port and oriented to be closed when said first cylindrical valve liner port is aligned with said exhaust tube and aligned with said exhaust tube when said first cylindrical valve liner port is aligned with said aspirator.

6. A multipurpose control valve according to claim 5 wherein said third cylindrical valve liner port has smaller orifice than said funnel-shaped portion port and is oriented such that said third cylindrical valve liner port is aligned with said aspirator when said first cylindrical valve chamber port is aligned with said exhaust tube and said third cylindrical valve liner port is closed when said first cylindrical valve liner port is aligned with said aspirator.

7. The multipurpose control valve according to claim 6 wherein said first cylindrical valve liner port is angularly displaced from said second cylindrical valve liner port by 150 degrees and said second cylindrical valve liner port is angularly displaced from said third cylindrical valve liner port by 75 degrees.

8. A multipurpose control valve comprising a stationary outer casing and a rotatable inner casing, said outer casing comprising an inlet tube, a cylindrical valve chamber at the terminus of said inlet tube; a cover plate forming one closure for said cylindrical valve chamber; a pair of ports in the side of said inlet tube; first and second cylindrical valve chamber ports in the wall of said cylindrical valve chamber; said pair of inlet tube ports being angularly displaced from said first and second cylindrical valve chamber ports; an aspirator extending outwardly from said first cylindrical valve chamber port; and an exhaust tube extending outwardly from said second cylindrical valve chamber port; said rotatable inner casing comprising a hollow elbow-shaped tubular member having a linear portion and a funnel-shaped portion; said linear portion having at least one port being oriented so as to be in alignment with one of said pair of inlet tube ports when all other ports of said control valve are closed; said funnel-shaped portion lying perpendicular to said linear portion; said funnel-shaped portion having a valve port at its terminus; a cylindrical valve liner snugly fitted within said cylindrical valve chambers having a first port, a second port and a third port; said first cylindrical valve liner port being larger than said funnel-shaped portion port and fixedly aligned therewith; said second cylindrical valve liner port being larger than said funnel-shaped portion port and oriented to be closed when said first cylindrical valve liner port is aligned with said second cylindrical valve chamber port and aligned with said second cylindrical valve chamber port when said first cylindrical valve liner port is aligned with said first cylindrical valve chamber port; said third cylindrical valve liner port having a smaller orifice than said funnel-shaped portion port and oriented such that said third cylindrical valve liner port is aligned with said first cylindrical valve chamber port when said first cylindrical valve liner port is aligned with said second cylindrical valve chamber port and said third cylinder valve liner port is closed when said first cylindrical valve liner port is aligned with said first cylindrical valve chamber port, a locator for said cylindrical valve liner through which said liner portion passes and in which said elbow-shaped rotary valve is secured; and means for turning said rotatable inner casing within said stationary outer casing.

9. A multipurpose control valve in accordance with claim 8 wherein said first cylindrical valve liner port is angularly displaced from said second cylindrical valve liner port by 150 degrees and said second cylindrical valve liner port is angularly displaced from said third cylindrical valve liner port by 75 degrees.

10. A multipurpose control valve in accordance with claim 8 wherein said means for turning said rotatable inner casing relative to said stationary outer casing, comprising a center plug secured to one end of said rotatable inner casing, a cover plate having a plurality of recesses therein and being mounted on said valve chamber, a control handle fixedly mounted on said center plug outside said cover plate and having a detent mounted therein, said handle operative to selective engage said recesses to provide a plurality of fixed settings for said valve by turning said handle.

References Cited
UNITED STATES PATENTS

| | | | |
|---|---|---|---|
| 1,491,115 | 4/1924 | Taylor | 137—625.47 XR |
| 1,545,700 | 7/1925 | Schmidt | 103—262 |
| 2,327,046 | 8/1943 | Hunter. | |
| 2,649,113 | 8/1953 | Cizek | 251—297 XR |
| 3,094,173 | 6/1963 | Hausmann et al. | 137—625.16 XR |
| 3,165,122 | 1/1965 | Sachnik | 137—625.47 |

FOREIGN PATENTS 113,660  3/1918  Great Britain.

ROBERT G. NILSON, Primary Examiner

U.S. Cl. X.R.

137—604, 625.16, 625.24; 251—297